United States Patent
Lai et al.

(10) Patent No.: US 11,192,212 B2
(45) Date of Patent: Dec. 7, 2021

(54) LATE CUSTOMIZATION ON VALVE BODY END CONNECTIONS USING ADDITIVE MANUFACTURING

(71) Applicant: FISHER CONTROLS INTERNATIONAL LLC, Marshalltown, IA (US)

(72) Inventors: Tan K. Lai, Singapore (SG); Chong S. Siang, Singapore (SG)

(73) Assignee: FISHER CONTROLS INTERNATIONAL LLC, Marshalltown, IA (US)

(*) Notice: Subject to any disclaimer, the term of this patent is extended or adjusted under 35 U.S.C. 154(b) by 105 days.

(21) Appl. No.: 16/443,825

(22) Filed: Jun. 17, 2019

(65) Prior Publication Data

US 2019/0299342 A1  Oct. 3, 2019

Related U.S. Application Data

(62) Division of application No. 15/151,255, filed on May 10, 2016, now Pat. No. 10,322,476.

(51) Int. Cl.
| | |
|---|---|
| *B23P 15/00* | (2006.01) |
| *F16K 27/00* | (2006.01) |
| *B33Y 80/00* | (2015.01) |
| *B22F 5/10* | (2006.01) |
| *B33Y 10/00* | (2015.01) |

(Continued)

(52) U.S. Cl.
CPC ............ *B23P 15/001* (2013.01); *B22F 5/10* (2013.01); *B22F 7/08* (2013.01); *B33Y 10/00* (2014.12);
(Continued)

(58) Field of Classification Search
CPC ...... B23P 15/001; B22F 5/10; B23K 15/0086; B23K 26/342; B23K 2101/04;
(Continued)

(56) References Cited

U.S. PATENT DOCUMENTS

| | | |
|---|---|---|
| 5,207,371 A | 5/1993 | Prinz et al. |
| 2009/0001060 A1 | 1/2009 | Orye et al. |

(Continued)

FOREIGN PATENT DOCUMENTS

| | | |
|---|---|---|
| CH | 691 502 A5 | 7/2001 |
| CN | 102840370 A | 12/2012 |

(Continued)

OTHER PUBLICATIONS

Special Processing and Micronano Manufacturing, 2012-2013 Report on Advances in Mechanical Engineering, China Association for Science and Technology, pp. 167-169, Science and Technology of China Press.

(Continued)

*Primary Examiner* — Christopher J Besler
(74) *Attorney, Agent, or Firm* — Marshall, Gerstein & Borun LLP (57) ABSTRACT

A method is provided of custom manufacturing a valve body having an initial valve body configuration having a first end connection and a second end connection. The method includes adding material to the first end connection using a first additive manufacturing process to create at least a portion of a custom first end connection configuration, and the custom first end connection configuration is different than an initial first end connection configuration. The method further includes adding material to the second end connection using a second additive manufacturing process to create at least a portion of a custom second end connection configuration, and the custom second end connection configuration is different than an initial second end connection configuration.

20 Claims, 6 Drawing Sheets

(51) Int. Cl.
*F16K 27/10* (2006.01)
*B23K 26/342* (2014.01)
*B22F 7/08* (2006.01)
*B33Y 30/00* (2015.01)

(52) U.S. Cl.
CPC .............. *B33Y 80/00* (2014.12); *F16K 27/00* (2013.01); *B22F 2999/00* (2013.01); *B23K 26/342* (2015.10); *B33Y 30/00* (2014.12); *F16K 27/10* (2013.01); *Y02P 10/25* (2015.11)

(58) Field of Classification Search
CPC .......... F16K 27/10; F16K 27/12; F16K 27/00; B33Y 10/00; B33Y 80/00
See application file for complete search history.

(56) References Cited

U.S. PATENT DOCUMENTS

| | | | |
|---|---|---|---|
| 2015/0247474 A1 | 9/2015 | Evers et al. | |
| 2016/0161014 A1 | 6/2016 | Lv et al. | |
| 2017/0102089 A1 | 4/2017 | Griffin, Jr. et al. | |
| 2017/0326668 A1 | 11/2017 | Grabau | |
| 2018/0065208 A1 | 3/2018 | Mori et al. | |

FOREIGN PATENT DOCUMENTS

| | | | | |
|---|---|---|---|---|
| CN | 104295784 A | 1/2015 | | |
| WO | WO-2015/007013 A1 | 1/2015 | | |
| WO | WO-2015/071675 A2 | 5/2015 | | |
| WO | WO-2015089252 A1 * | 6/2015 | ............ | B23P 15/001 |
| WO | WO-2016/152475 A1 | 9/2016 | | |

OTHER PUBLICATIONS

First Office Action received for Chinese Application No. 201710324961.1, dated Oct. 23, 2019.

International Search Report for Application No. PCT/US2017/028103, dated Sep. 6, 2017.

Written Opinion for Application No. PCT/US2017/028103, dated Sep. 6, 2017.

* cited by examiner

LATE CUSTOMIZATION ON VALVE BODY END CONNECTIONS USING ADDITIVE MANUFACTURING

CROSS-REFERENCE TO RELATED APPLICATION

This application is a divisional of U.S. patent application Ser. No. 15/151,255, entitled "Late Customization on Valve Body End Connections Using Additive Manufacturing," and filed on May 10, 2016, the entire disclosure of which is hereby incorporated by reference herein.

FIELD OF THE DISCLOSURE

This disclosure relates generally to the manufacturing of valve bodies, and, more particularly, to the manufacturing of valve body ends.

BACKGROUND

The valve manufacturing industry consists of extremely high product variation and relatively low quantity of manufacture. One layer of complexity is due to the variety of inlet and outlet end connection configurations that are required by each customer. For example, a first customer may require a ring type joint flange configuration for the inlet and outlet end connections on each valve, while a second customer may require a socket weld configuration for the inlet and outlet end connections on each valve. Because the inlet and outlet end connections on each of the first customer's valves are physically different than the inlet and outlet end connections on each of the second customer's valves, only valves specifically manufactured for the first customer may be sold to the first customer, and only valves specifically manufactured for the second customer may be sold to the second customer. Accordingly, sales forecasting is relied upon to estimate the number of each of the first and second customer's valves that must be produced to meet the expected demand of that particular customer. If too many valves are manufactured for either customer, those excess valves waste production capacity to sit in inventory (and occupy valuable space) until a future order is placed. If too few valves are manufactured, a rush order may be required to meet a customer order. Because each valve body is typically sand casted at a remote foundry, the process of fabricating each valve body may take too long to meet such a short time frame, and delivery may be late. Accordingly, it would desirable to reduce inventory levels of customer-specific inlet and outlet end connection configurations, reduce reliance on sales forecasting on valves using such customer-specific end connection configurations, and decreasing production lead times for valves using such customer-specific end connection configurations.

BRIEF SUMMARY OF THE DISCLOSURE

A method is provided of custom manufacturing a valve body having an initial valve body configuration having a first end connection and a second end connection, the first end connection having an initial first end connection configuration and the second end connection having an initial second end connection configuration. The method includes adding (a first portion of) material to the first end connection using a first additive manufacturing process to create at least a portion of a custom first end connection configuration, wherein the custom first end connection configuration is different than the initial first end connection configuration. The method further includes adding (a second portion of) material to the second end connection using a second additive manufacturing process to create at least a portion of a custom second end connection configuration, wherein the custom second end connection configuration is different than the initial second end connection configuration.

A method is provided of custom manufacturing a first valve body having an inlet end connection and an outlet end connection, a second valve body having an inlet end connection and an outlet end connection, and a third valve body having an inlet end connection and an outlet end connection. The method includes storing the first valve body at a first storage location, wherein the inlet end connection of the first valve body has an initial inlet end connection configuration and the outlet end connection of the first valve body has an initial outlet end connection configuration. The method also includes storing the second valve body at a second storage location, wherein the inlet end connection of the second valve body has an initial inlet end connection configuration and the outlet end connection of the second valve body has an initial outlet end connection configuration, wherein the initial inlet end connection configuration of the second valve body is identical to the initial inlet end connection configuration of the first valve body and the initial outlet end connection configuration of the second valve body is identical to the initial outlet end connection configuration of the first valve body. The method further includes storing the third valve at a third storage location, wherein the inlet end connection of the third valve body having an initial inlet end connection configuration and the outlet end connection of the third valve body having an initial outlet end connection configuration, wherein the initial inlet end connection configuration of the third valve body is identical to the initial inlet end connection configuration of the first valve body and the initial outlet end connection configuration of the third valve body is identical to the initial outlet end connection configuration of the first valve body. The method additionally includes transferring the first valve body from the first storage location to a first manufacturing position and adding material to the inlet end connection of the first valve body at the first manufacturing position. Adding material to the inlet end connection of the first valve body at the first manufacturing position includes using a first additive manufacturing process to create at least a first portion of a custom inlet end connection configuration, wherein the custom inlet end connection configuration of the first valve body is different than the initial inlet end connection configuration of the first valve body. The method also includes transferring the second valve body from the second storage location to a second manufacturing position and adding material to the inlet end connection of the second valve body at the second manufacturing position. Adding material to the inlet end connection of the second valve body at the second manufacturing position includes adding material to the inlet end connection of the second valve body using the first additive manufacturing process to create at least a first portion of a custom inlet end connection configuration, wherein the custom inlet end connection configuration of the second valve body is different than the initial inlet end connection configuration of the second valve body and the custom inlet end connection configuration of the first valve body. The method further includes transferring the third valve body from the second storage location to a third manufacturing position and adding material to the inlet end connection of the third valve body at the third manufacturing position. Adding material to the inlet end connection of the third valve body at the third manufacturing position includes adding material to the inlet end connection of the third valve body using the first additive manufacturing process to create at least a first portion of a custom inlet end connection configuration, wherein the custom inlet end connection configuration of the third valve body is different than the initial inlet end connection configuration of the third valve body, the custom inlet end connection configuration of the first valve body, and the custom inlet end connection configuration of the second valve body.

DETAILED DESCRIPTION

A method of custom manufacturing a valve body 10 is provided, and the valve body 10 has an initial valve body configuration 12 (illustrated in FIG. 1) having a first end connection 14 and a second end connection 16. The first end connection 14 has an initial first end connection configuration 18 and the second end connection 16 has an initial second end connection configuration 20. The method includes adding material to the first end connection 14 using a first additive manufacturing process (for example, a directed energy laser deposition process or a three-dimensional printing process) to create at least a portion of a custom first end connection configuration 22 (as illustrated in FIG. 2), and the custom first end connection configuration 22 is different than the initial first end connection configuration 18. The method also includes adding material to the second end connection 16 using a second additive manufacturing process (for example, a directed energy laser deposition process or a three-dimensional printing process) to create at least a portion of a custom second end connection configuration 24 (as illustrated in FIG. 2), and the custom second end connection configuration 24 is different than the initial second end connection configuration 20.

So configured, a plurality of "generic" valve bodies 10 (identical to that illustrated in FIG. 1) having identical initial first end connection configurations 18 and initial second end connection configurations 20 can be "late customized" based on customer-specific end configurations requirements.

That is, by use of an additive manufacturing processes, a first valve body 10 may have the initial first end connection configurations 18 (for example, a butt weld configuration) modified to a custom first end connection configuration 22 (for example, a first flange configuration having a first diameter and a first thickness), such as that illustrated in FIG. 2. In addition, by using the same (or a different) additive manufacturing processes, a second valve body 10 may have the initial first end connection configurations 18 (for example, the butt weld configuration of the first valve body 10a) modified to a different custom first end connection configuration 22 (for example, a second flange configuration having a second diameter and a second thickness), such as that illustrated in FIG. 3. Similarly, the custom second end connection configurations 24 for each of the first and second valve bodies 10 can be created from the initial second end connection configuration 20 on a generic valve body 10. Accordingly, instead of casting two complete and finished valve bodies for each custom first end connection configuration 22 of the first and second valve bodies, the generic valve bodies 10 can be modified quickly and on a per-order basis into a desired custom first end connection configuration 22. Thus, maintaining an accurate inventory of finished valve bodies having a corresponding custom first end connection configurations 22 (and/or custom second end connection configurations 24) is no longer necessary, as custom requirements can be created on an as-needed basis from the generic valve bodies 10.

Figure 1:
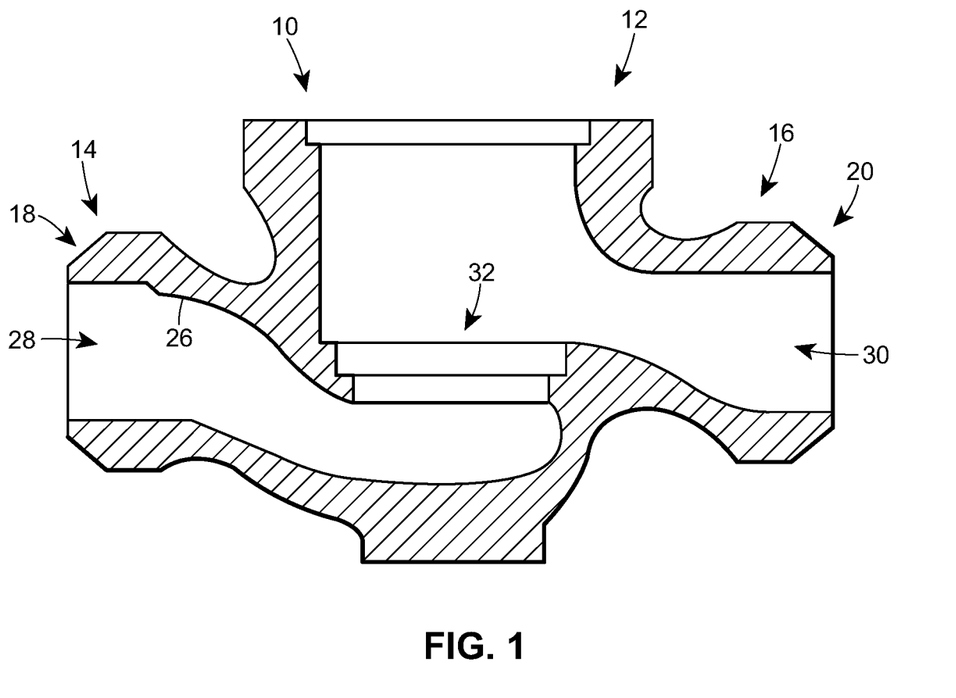
FIG. 1 is a sectional side view of an embodiment of a valve body having an initial valve body configuration with a first end connection having an initial first end connection configuration and a second end connection having an initial second end connection configuration.
Figure 2:
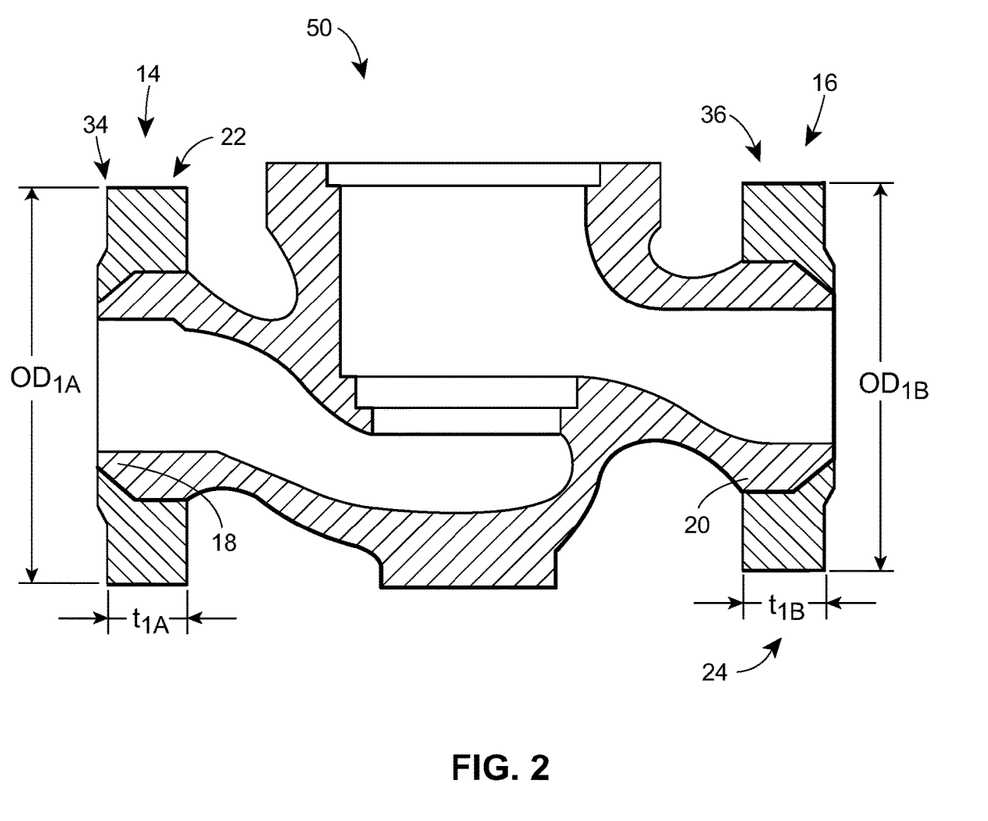
FIG. 2 is a sectional side view of another embodiment of a valve body having a first end connection having a custom first end connection configuration and a second end connection having a custom second end connection configuration.

Turning to the method in more detail, FIG. 1 illustrates the initial valve body configuration 12 of the valve body 10 that includes the first end connection 14 and the second end connection 16. The first end connection 14 may be an inlet end connection and the second end connection 16 may be an outlet end connection. However, the first end connection 14 may be an outlet end connection and the second end connection 16 may be an inlet end connection. In some embodiments, the initial valve body configuration 12 of the valve body 10 may also have a third end connection (not shown) or additional end connections. The valve body 10 may have a plurality of interior surfaces 26 that cooperate to define an inlet 28, and outlet 30, and a valve seat 32 disposed between the inlet 28 and the outlet 30. The valve seat 32 may be adapted to be selectively engaged by a valve plug (not shown) that moves in a known manner between a closed position (in which the valve plug sealingly engages the valve seat 32) and an open position (in which the valve plug does not sealingly engage the valve seat 32).

The first end connection 14 has an initial first end connection configuration 18 and the second end connection 16 has an initial second end connection configuration 20. Each of the initial first end connection configuration 18 and the initial second end connection configuration 20 may be any end connection configuration that can be later modified to a suitable custom first end connection configuration 22 and a custom second end connection configuration 24, respectively. For example, as illustrated in FIG. 1, one or both of the initial first end connection configuration 18 and the initial second end connection configuration 20 may be a butt weld end connection or may be an endless end configuration. However, any suitable end connection is contemplated, including screwed ends, socket weld ends, raised face and ring type joint flanges, and Graloc® hubs, for example. The initial valve body configuration 12 of the valve body 10 may be made, fabricated, and/or manufactured by any suitable method, such as by casting (e.g., sand casting) the initial valve body configuration 12 of the valve body 10. The initial valve body configuration 12 of the valve body 10 may be made, fabricated, and/or manufactured at any suitable location, and the location may not be in the same facility in which the first additive manufacturing process and/or first additive manufacturing process occurs. The initial valve body configuration 12 of the valve body 10 may be made, fabricated, and/or manufactured from any suitable material or combination of materials. For example, the initial valve body configuration 12 of the valve body 10 may be made, fabricated, and/or manufactured from a first material, which may be a metal, such as a steel material (e.g., carbon steel).

A custom modification may be made to the initial valve body configuration 12 of the valve body 10 for any suitable reason. For example, a first customer may have a first set of requirements for a configuration of the first end connection 14 and the second end connection 16 that require a modification to the initial first end connection configuration 18 and the initial second end connection configuration 20. Accordingly, the initial first end connection configuration 18 may be modified by a first additive manufacturing process to create at least a portion of the custom first end connection configuration 22 of the valve body 50 of FIG. 2 and the initial second end connection configuration 20 may be modified by a second additive manufacturing process to create at least a portion of the custom second end connection configuration 24 of the valve body 50 of FIG. 2. The custom first end connection configuration 22 may be different than the initial first end connection configuration 18, and the custom second end connection configuration 24 may be different than the initial second end connection configuration 20.

The first additive manufacturing process may be the same as the second additive manufacturing process. However, in some embodiments, the first additive manufacturing process may be different than the second additive manufacturing process. The first additive manufacturing process may be any additive manufacturing process or technology that builds three-dimensional objects by adding successive layers of material on a material. The first additive manufacturing process (and/or the second additive manufacturing process) may be performed by any suitable machine or combination of machines. The first additive manufacturing process may typically involve or use a computer, three-dimensional modeling software (e.g., Computer Aided Design, or CAD, software), machine equipment, and layering material. Once a CAD model is produced, the machine equipment may read in data from the CAD file and layer or adds successive layers of liquid, powder, sheet material (for example) in a layer-upon-layer fashion to fabricate a three-dimensional object. The first additive manufacturing process (and/or the second additive manufacturing process) may include any of several processes, such as example only, a stereolithography ("SLA") process, a fused deposition modeling ("FDM") process, multi-jet modeling ("MJM") process, and a selective laser sintering ("SLS") process. In some embodiments, the first additive manufacturing process (and/or the second additive manufacturing process) may include a directed energy laser deposition process. Such a directed energy laser deposition process may be performed by a multi-axis computer-numerically-controlled ("CNC") lathe with directed energy laser deposition capabilities.

As previously explained, material may be added to the first end connection 14 of the valve body 10 using the first additive manufacturing process to create at least a portion of the custom first end connection configuration 22 of the embodiment of the valve body 50 illustrated in FIG. 2. The material added may be the same material as the material used to make, fabricate, and/or manufacture the valve body 10 (e.g. the material may be the first material). However, the material added may be a different material than the material used to make, fabricate, and/or manufacture the valve body 10 (e.g. the material may be a second material that is different than the first material).

In some embodiments, as illustrated in FIG. 1, the initial first end connection configuration 18 may be a butt-weld connection that may be suitable for butt-welding to a corresponding butt-weld connection on an adjacent end of a downstream inlet pipe. However, a customer may require a custom first end connection configuration 22 that is a flange configuration having a particular thickness and outer diameter, and therefore the valve body 10 having the initial valve body configuration 12 may be machined or processed (using the first additive manufacturing process) to add material to the initial first end connection configuration 18 to create at least a portion of the custom first end connection configuration 22 of the valve body 50, which may be a first end flange 34 having a thickness $t_{1A}$ and an outside diameter $OD_{1A}$. The custom first end connection configuration 22 of the valve body 50 may be any suitable end connection that is different than the initial first end connection configuration 18, and any suitable end connection is contemplated, such as screwed ends, socket weld ends, raised face and ring type joint flanges, and Graloc® hubs, for example.

The creation, manufacturing, or fabrication of the custom first end connection configuration 22 may also require removing material from the first end connection 14 (for example, in the initial first end connection configuration 18) using a first material removal process to create at least a portion of the custom first end connection configuration 22. The first material removal process may be performed by any suitable machine or combination of machines, and the first material removal process may be performed prior to, after, or during the first additive manufacturing process. For example, the first material removal process may be a cutting process performed by a lathe and/or a drilling process performed by a drill. In some embodiments, the first material removal process may be performed by the same equipment (e.g., machine or combination of machines) that performs the first additive manufacturing process. For example, the first material removal process may be performed by the multi-axis computer-numerically-controlled ("CNC") lathe with directed energy laser deposition capabilities.

In some embodiments, as illustrated in FIG. 1, the initial second end connection configuration 20 may be identical to the initial first end connection configuration 18, and the initial second end connection configuration 20 may also be a butt-weld connection. Accordingly, the customer may require a custom second end connection configuration 24 of the valve body 50 that may be identical to the custom first end connection configuration 22, and the custom second end connection configuration 24 may be a second end flange 36 having a thickness $t_{1B}$ and an outside diameter $OD_{1B}$, and the thickness $t_{1B}$ and an outside diameter $OD_{1B}$ may be identical to the thickness $t_{1A}$ and an outside diameter $OD_{1A}$ of the first end flange 34. However the custom second end connection configuration 24 may be any suitable end connection that is different than the initial second end connection configuration 20, and any suitable end connection is contemplated, such as screwed ends, socket weld ends, raised face and ring type joint flanges, and Graloc® hubs, for example.

Therefore, the valve body 10 having the initial valve body configuration 12 may be machined or processed (using the second additive manufacturing process) to add material to the initial second end connection configuration 20 to create at least a portion of the custom second end connection configuration 22 of the valve body embodiment 50. The second additive manufacturing process may be the same as the first additive manufacturing process discussed in reference to the creation of at least a portion of the custom first end connection configuration 20. The material added may be the same material as the material used to make, fabricate, and/or manufacture the valve body 10 (e.g., the material may be the first material) and or the same material added to the first end connection 14 of the valve body 10 using the first additive manufacturing process. However, the material added during the second additive manufacturing process may be different than the first material and the material added during the first additive manufacturing process (e.g. the material may be a third material that is different than the first material and the second material). In other embodiments, the material added during the second additive manufacturing process may be different than the first material and but the same as the material added during the first additive manufacturing process (e.g. the material may be the second material).

The creation, manufacturing, or fabrication of the custom second end connection configuration 24 of the valve body 50 may also require removing material from the second end connection 16 (for example, in the initial second end connection configuration 20) using a second material removal process to create at least a portion of the custom second end connection configuration 24. The second material removal process may be performed by any suitable machine or combination of machines, and the second material removal process may be similar to the first material removal process described in the discussion of the custom first end connection configuration 22. Specifically, the second material removal process may be performed prior to, after, or during the second additive manufacturing process, and the second material removal process may be a cutting process performed by a lathe and/or a drilling process performed by a drill. In some embodiments, the second material removal process may be performed by the same equipment (e.g., machine or combination of machines) that performs the first additive manufacturing process, and/or the second additive manufacturing process, and/or the first material removal process. For example, the second material removal process may be performed by the multi-axis computer-numerically-controlled ("CNC") lathe with directed energy laser deposition capabilities.

As previously explained, the initial valve body configuration 12 of the valve body 10 may be "generic" to at least two different end connection configurations. Therefore, the initial valve body configuration 12 of a different valve body 100 (see FIG. 3) may be modified to a different set of customer requirements in the manner previously described (e.g., may be modified differently than the embodiment of the valve body 50 of FIG. 2). That is, the initial first end connection configuration 18 of the valve body 10 may be modified by the first additive manufacturing process that was previously described to create at least a portion of the custom first end connection configuration 22 of the valve body 100 and the initial second end connection configuration 20 of the valve body 100 may be modified by a second additive manufacturing process to create at least a portion of the custom second end connection configuration 24 of the valve body 100.

Figure 3:
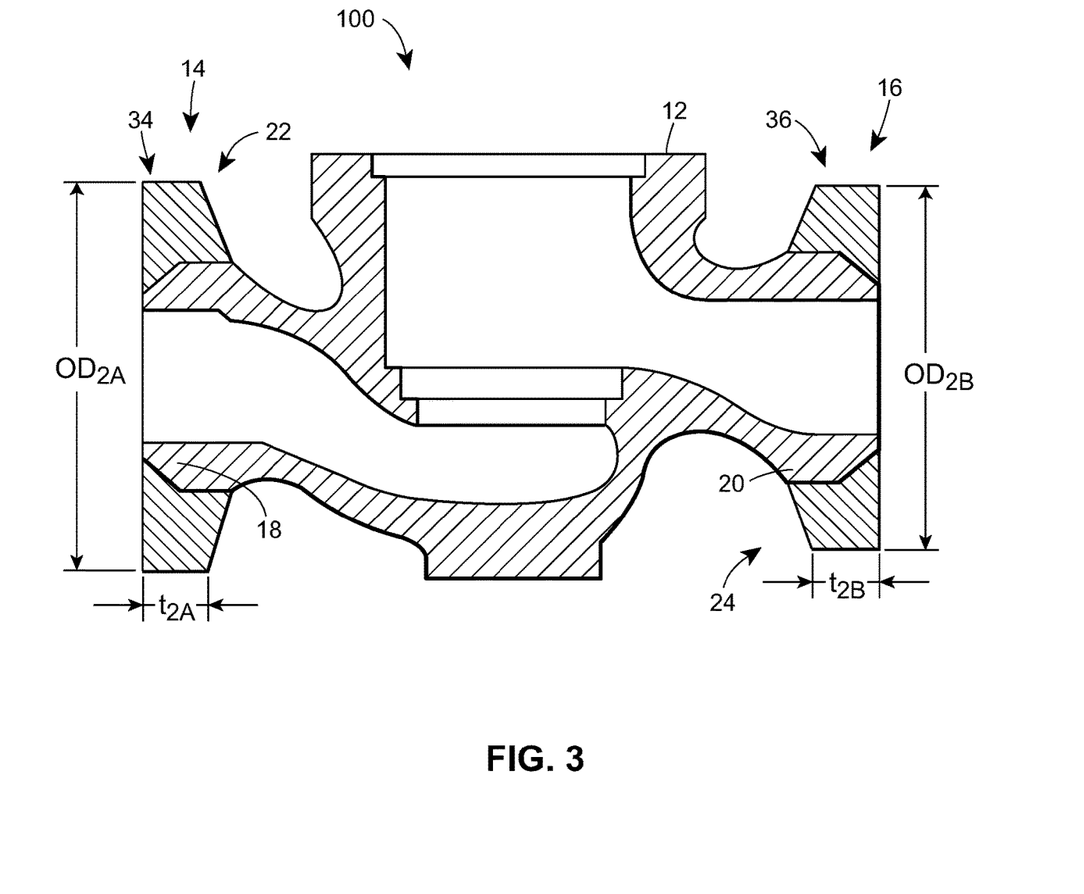
FIG. 3 is a sectional side view of an additional embodiment of a valve body having a first end connection having a custom first end connection configuration and a second end connection having a custom second end connection configuration.

The custom first end connection configuration 22 of the valve body 100 may be different than the custom first end connection configuration 22 of the valve body 50 (illustrated in FIG. 2) and the custom second end connection configuration 24 of the valve body 100 may be different than the custom second end connection configuration 24 of the valve body 50 (illustrated in FIG. 2). For example, as illustrated in FIG. 3, the custom first end connection configuration 22 of the valve body 100 may have a particular thickness and outer diameter, and material may be added or removed as described above to create at least a portion of the custom first end connection configuration 22 of the valve body 100, which may be a first end flange 34 having a thickness $t_{2A}$ and an outside diameter $OD_{2A}$.

In addition, the custom second end connection configuration 24 of the valve body 100 may have a particular thickness and outer diameter, and material may be added or removed as described above to create at least a portion of the custom second end connection configuration 24 of the valve body 100, which may be a second end flange 36 having a thickness $t_{2B}$ and an outside diameter $OD_{2B}$. The thickness $t_{2B}$ and an outside diameter $OD_{2B}$ may be identical to the thickness $t_{2A}$ and an outside diameter $OD_{2A}$ of the first end flange 34 of the valve body 100. However, any or all of the thicknesses $t_{2A}$ and $t_{2B}$ and/or the outside diameters $OD_{2A}$, $OD_{2B}$ of the valve body 100 (of FIG. 3) may be different than any or all of the corresponding thicknesses $t_{2A}$ and $t_{2B}$ and/or the corresponding outside diameters $OD_{2A}$, $OD_{2B}$ of the valve body 50 (of FIG. 2). The first material, second material, and/or the third material used on the custom first end connection configuration 22 and/or the custom second end connection configuration 24 of the valve body 100 of FIG. 3 may be the same as (or any or all may different than) the first material, second material, and/or the third material used on the custom first end connection configuration 22 and/or the custom second end connection configuration 24 of the valve body 50 of FIG. 2.

Any number of custom first and second end configurations are possible using the "generic" valve body 10 having the initial valve body configuration 12 illustrated in FIG. 1. For example, a plurality of "generic" valve bodies 10 having the initial valve body configuration 12 (and the initial first end connection configuration 18 and the initial second end connection configuration 20) may be ordered from a supplier and stored in an appropriate storage location. When a customer-specific valve is ordered by a first customer, a "generic" valve body 10 is transferred from the storage location to a first manufacturing position. At the first manufacturing position, the initial valve body configuration 12 may be machined or processed (using the first additive manufacturing process) to add material to the initial first end connection configuration 18 to create at least a portion of the custom first end connection configuration 22 of the first customer, as previously described (e.g., as illustrated in FIG. 2). Also at the first manufacturing position, the initial valve body configuration 12 may be machined or processed (using the second additive manufacturing process) to add material to the initial second end connection configuration 20 to create at least a portion of the custom second end connection configuration 24 of the first customer, as previously described (e.g., as illustrated in FIG. 2). The customer-specific valve body 50 (of FIG. 2) is then ready to be shipped to the first customer.

When a customer-specific valve is ordered by a second customer, another "generic" valve body 10 is transferred from the appropriate storage location to the first (or a second) manufacturing position. At the first (or second)

manufacturing position, the initial valve body configuration 12 of the valve body 10 may be machined or processed (using the first additive manufacturing process) to add material to the initial first end connection configuration 18 to create at least a portion of the custom first end connection configuration 22 of the second customer, as previously described (e.g., as illustrated in FIG. 3). Also at the first (or second) manufacturing position, the initial valve body configuration 12 may be machined or processed (using the second additive manufacturing process) to add material to the initial second end connection configuration 20 to create at least a portion of the custom second end connection configuration 24 of the second customer, as previously described (e.g., as illustrated in FIG. 3). The customer-specific valve body 100 (of FIG. 3) is then ready to be shipped to the second customer. One having ordinary skill in the art would recognize that storing the plurality of "generic" valve bodies 10 and using "late customization" to make customer-specific modifications on a per-order basis reduces the reliance on sales forecasts and also requires less lead times to execute orders.

Figure 4:
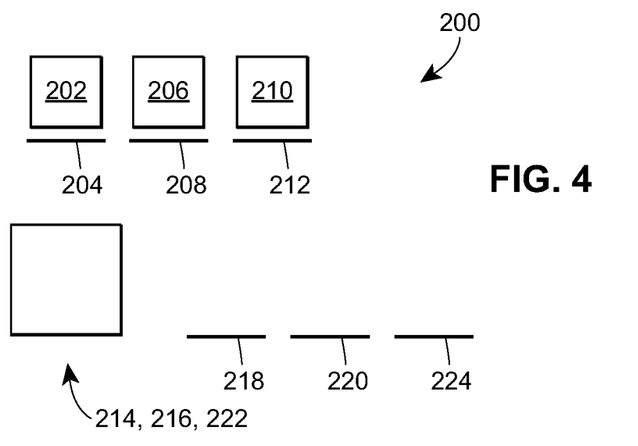
FIG. 4 is a schematic view of an embodiment of a system of custom manufacturing a valve body.

More specifically, with reference to FIG. 4, this method or system 200 of custom manufacturing of a valve body (or of a plurality of valve bodies) may include storing a first valve body 202 at a first storage location 204, a second valve body 206 at a second storage location 208, and a third valve body 210 at a third storage location 212. Each of the first valve body 202, the second valve body 206, and the third valve body 210 may be identical to the initial valve body configuration 12 of the valve body 10 illustrated in FIG. 1 (and previously described). That is, each of the first valve body 202, the second valve body 206, and the third valve body 210 may have an inlet (or first) end connection 14 having an initial inlet (or first) end connection configuration 18 and an outlet (or second) end connection 16 having an initial outlet (or second) end connection configuration 20. The initial inlet end connection configuration 18 of each of the first valve body 202, the second valve body 206, and the third valve body 210 may be identical and the initial outlet end connection configuration 20 of each of the first valve body 202, the second valve body 206, and the third valve body 210. The first storage location 204, the second storage location 208, and the third storage location 212 may each be at any suitable location. For example, the first storage location 204, the second storage location 208, and the third storage location 212 may each be bins or racks in the same storage facility or warehouse. In another example, the first storage location 204, the second storage location 208, and the third storage location 212 may each be in a different storage facility or warehouse.

Figure 5:
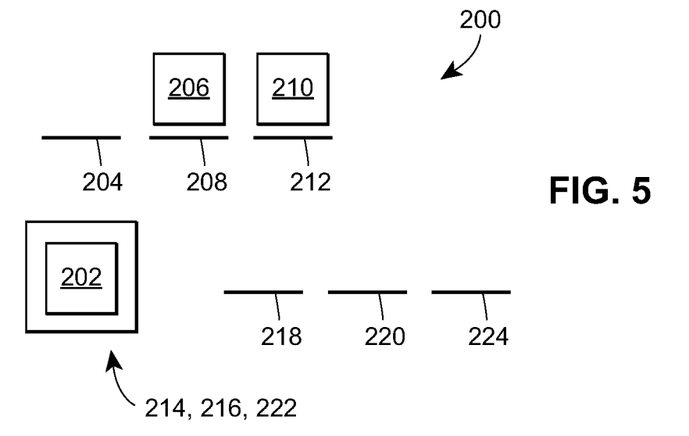
FIG. 5 is a schematic view of an embodiment of a system of custom manufacturing a valve body.
Figure 6:
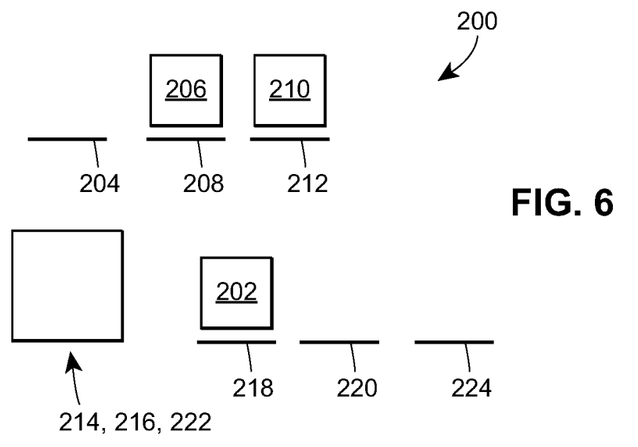
FIG. 6 is a schematic view of an embodiment of a system of custom manufacturing a valve body.

When an order is received from a first customer, the first valve body 202 is transferred from the first storage location 204 to a first manufacturing position 214, as illustrated in FIG. 5. The first manufacturing position 214 may be any location (or combination of locations) having one or more machines capable of performing the first additive manufacturing process, as previously described. At the first manufacturing position 214, material is added to the inlet end connection 14 of the first valve body 202, and a first additive manufacturing process is employed to create at least the first portion of a custom inlet end connection configuration 22 in the manner previously described. Also at the first manufacturing position 214 (or at a different manufacturing position), material may be added to the outlet end connection 16 of the first valve body 202, and a second additive manufacturing process may be employed to create at least the second portion of a custom outlet end connection configuration 24 in the manner previously described. The finished first valve body 202 having the custom inlet end connection configuration 22 and the custom outlet end connection configuration 24 may then be transferred to a first post-manufacturing location 218 that may be in a bin or racks in the same storage facility or warehouse as the first storage location 204, the second storage location 208, and the third storage location 212. In another example, the first post-manufacturing location 218 may be in a different storage facility or warehouse than the first storage location 204, the second storage location 208, and the third storage location 212. From the first post-manufacturing location 218, the first valve body 202 may be shipped to the first customer.

Figure 7:
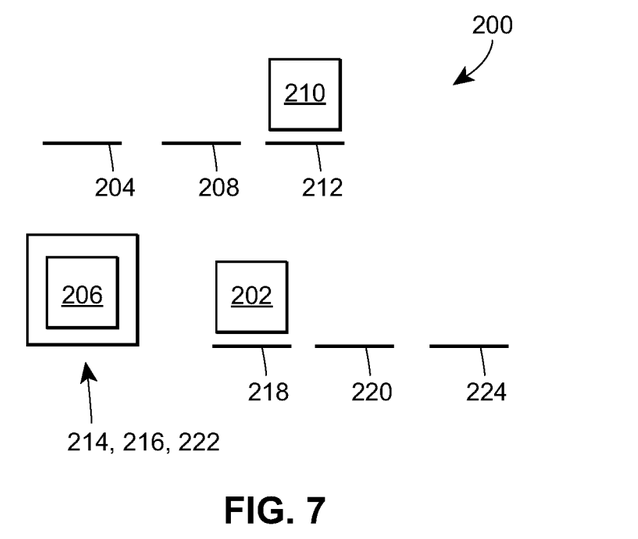
FIG. 7 is a schematic view of an embodiment of a system of custom manufacturing a valve body.

When an order is received from a second customer, the second valve body 206 is transferred from the second storage location 208 to a second manufacturing position 216, as illustrated in FIG. 7. The second manufacturing position 216 may be any location (or combination of locations) having one or more machines capable of performing the first additive manufacturing process, as previously described. In some embodiments, the second manufacturing position 216 may be the same or identical to the first manufacturing position 214. At the second manufacturing position 216, material is added to the inlet end connection 14 of the second valve body 206, and the first additive manufacturing process is employed to create at least the first portion of a custom inlet end connection configuration 22 in the manner previously described. The custom inlet end connection configuration 22 of the second valve body 206 may be different than the initial inlet end connection configuration 18 of the second valve body 206 and the custom inlet end connection configuration 22 of the first valve body 202. Also at the second manufacturing position 216 (or at a different manufacturing position), material may be added to the outlet end connection 16 of the second valve body 206, and the second additive manufacturing process may be employed to create at least the second portion of a custom outlet end connection configuration 24 in the manner previously described. The custom outlet end connection configuration 24 of the second valve body 206 may be different than the initial outlet end connection configuration 20 of the second valve body 206 and the custom outlet end connection configuration 24 of the first valve body 202.

Figure 8:
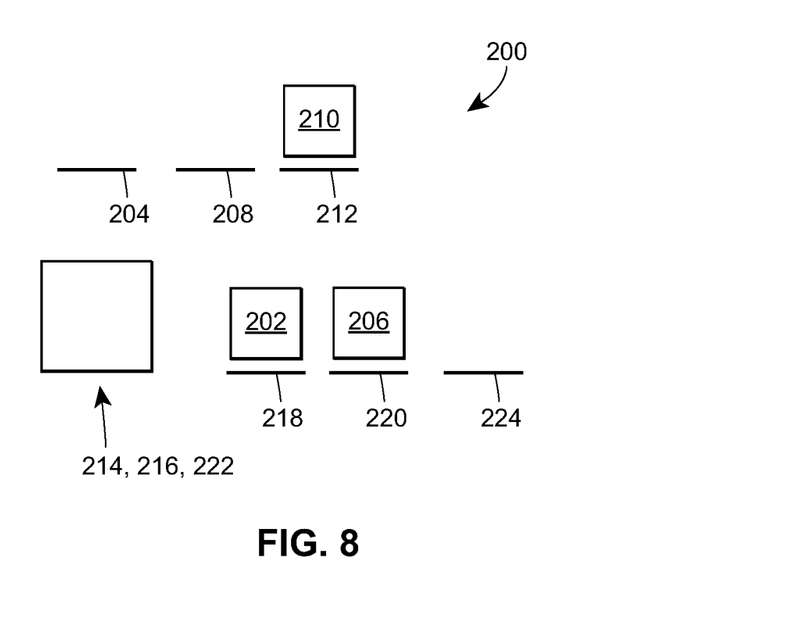
FIG. 8 is a schematic view of an embodiment of a system of custom manufacturing a valve body.

As illustrated in FIG. 8, the finished second valve body 206 having the custom inlet end connection configuration 22 and the custom outlet end connection configuration 24 may then be transferred to a second post-manufacturing location 220 that may be in a bin or racks in the same storage facility or warehouse as the first storage location 204, the second storage location 208, the third storage location 212, and/or the first post-manufacturing location 218. In another example, the second post-manufacturing location 220 may be in a different storage facility or warehouse than the first storage location 204, the second storage location 208, the third storage location 212, and/or the first post-manufacturing location 218. From the second post-manufacturing location 220, the second valve body 206 may be shipped to the second customer.

Figure 9:
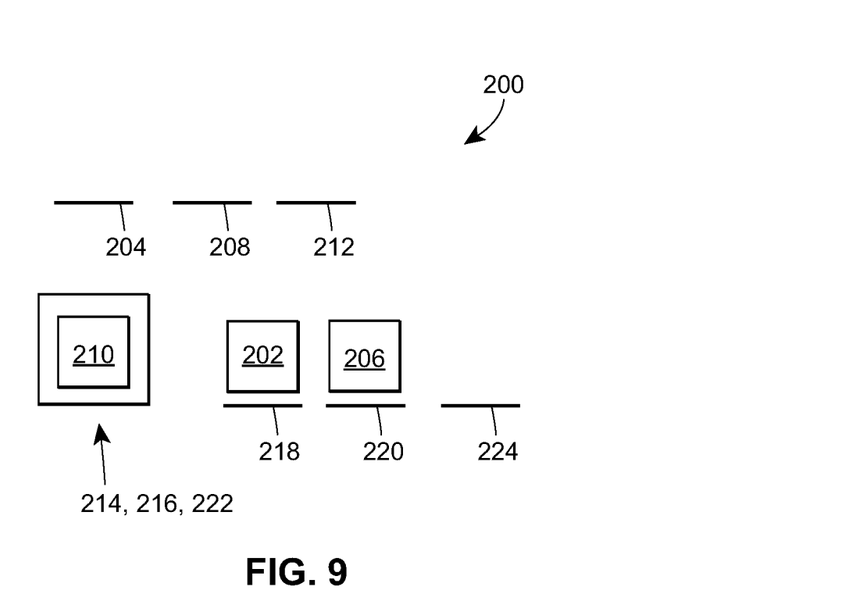
FIG. 9 is a schematic view of an embodiment of a system of custom manufacturing a valve body.

When an order is received from a third customer, the third valve body 210 is transferred from the third storage location 212 to a third manufacturing position 222, as illustrated in FIG. 9. The third manufacturing position 222 may be any location (or combination of locations) having one or more machines capable of performing the first additive manufacturing process, as previously described. In some embodiments, the third manufacturing position 222 may be the same or identical to the second manufacturing position 216 and/or the first manufacturing position 214. At the third manufacturing position 222, material is added to the inlet end connection 14 of the third valve body 210, and the first additive manufacturing process is employed to create at least the first portion of a custom inlet end connection configuration 22 in the manner previously described. The custom inlet end connection configuration 22 of the third valve body 210 may be different than the initial inlet end connection configuration 18 of the third valve body 210, the custom inlet end connection configuration 22 of the second valve body 206, and/or the custom inlet end connection configuration 22 of the first valve body 202. Also at the third manufacturing position 222 (or at a different manufacturing position), material may be added to the outlet end connection 16 of the third valve body 210, and the second additive manufacturing process may be employed to create at least the second portion of a custom outlet end connection configuration 24 in the manner previously described. The custom outlet end connection configuration 24 of the third valve body 210 may be different than the initial outlet end connection configuration 20 of the third valve body 210, the custom outlet end connection configuration 24 of the second valve body 206, and/or the custom outlet end connection configuration 24 of the first valve body 202.

Figure 10:
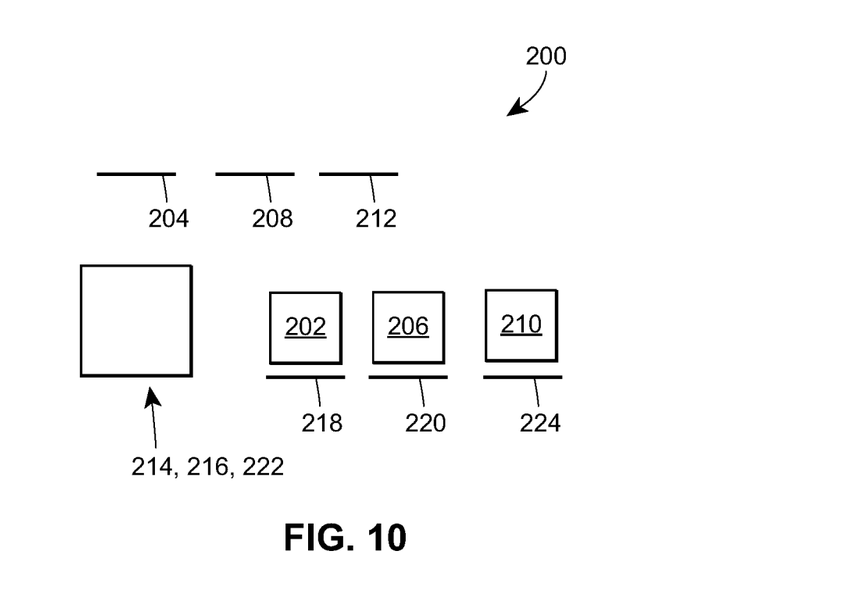
FIG. 10 is a schematic view of an embodiment of a system of custom manufacturing a valve body.

As illustrated in FIG. 10, the finished third valve body 210 having the custom inlet end connection configuration 22 and the custom outlet end connection configuration 24 may then be transferred to a third post-manufacturing location 224 that may be in a bin or racks in the same storage facility or warehouse as the first storage location 204, the second storage location 208, and the third storage location 212, the first post-manufacturing location 218, and/or the second post-manufacturing location 220. In another example, the third post-manufacturing location 224 may be in a different storage facility or warehouse than the first storage location 204, the second storage location 208, the third storage location 212, the first post-manufacturing location 218, and/or the second post-manufacturing location 220. From the third post-manufacturing location 224, the third valve body 210 may be shipped to the third customer.

Accordingly, the method 200 provides for late customization of generic flange configurations of a plurality of generic valve bodies to a desired (customer-specific) flange configuration directly on the generic valve body by use of additive manufacturing techniques, such as directed energy laser deposition. Consequently, a large volume of generic valve body castings (such as the first valve body 202, the second valve body 206, and the third valve body 210) can be created and subsequently customized with desired flange or end configurations as required, thereby reducing inventory levels of customer-specific flange configurations, reducing reliance on sales forecasting, and decreasing production lead times.

While various embodiments have been described above, this disclosure is not intended to be limited thereto. Variations can be made to the disclosed embodiments that are still within the scope of the appended claims.

What is claimed is:

1. A method of custom manufacturing a plurality of different valve bodies for different customers, the method comprising:

storing a first generic valve body at a first storage location, the first generic valve body having a first inlet end connection and a first outlet end connection, wherein the first inlet end connection has a first initial inlet end connection configuration and the first outlet end connection has a first initial outlet end connection configuration, storing a second generic valve body at a second storage location, the second generic valve body having a second inlet end connection and a second outlet end connection, wherein the second inlet end connection has a second initial inlet end connection configuration and the second outlet end connection has a second initial outlet end connection configuration, wherein the second initial inlet end connection configuration is identical to the first initial inlet end connection configuration and the second initial outlet end connection configuration is identical to the first initial outlet end connection configuration;

storing a third generic valve body at a third storage location, the third generic valve body having a third inlet end connection and a third outlet end connection, wherein the third inlet end connection has a third initial inlet end connection configuration and the third outlet end connection has a third initial outlet end connection configuration, wherein the third initial inlet end connection configuration is identical to the first initial inlet end connection configuration and the third initial outlet end connection configuration is identical to the first initial outlet end connection configuration;

receiving a first customer requirement for a first custom inlet end connection configuration for the first generic valve body;

transferring the first generic valve body from the first storage location to a first manufacturing position;

adding material to the first inlet end connection of the first generic valve body at the first manufacturing position, wherein adding material to the first inlet end connection of the first generic valve body at the first manufacturing position includes using a first additive manufacturing process to create at least a first portion of the first custom inlet end connection configuration based on the received first customer requirement, wherein the first custom inlet end connection configuration is different than the first initial inlet end connection configuration;

receiving a second customer requirement for a second custom inlet end connection configuration for the second generic valve body;

transferring the second generic valve body from the second storage location to a second manufacturing position;

adding material to the second inlet end connection of the second generic valve body at the second manufacturing position, wherein adding material to the second inlet end connection of the second generic valve body at the second manufacturing position includes adding material to the second inlet end connection of the second generic valve body using the first additive manufacturing process to create at least a first portion of the second custom inlet end connection configuration based on the received second customer requirement, wherein the second custom inlet end connection configuration is different than the second initial inlet end connection configuration and the first custom inlet end connection configuration;

receiving a third customer requirement for a third custom inlet end connection configuration for the third generic valve body;

transferring the third generic valve body from the second storage location to a third manufacturing position;

adding material to the third inlet end connection of the third generic valve body at the third manufacturing position, wherein adding material to the third inlet end connection of the third generic valve body at the third manufacturing position includes adding material to the third inlet end connection of the third generic valve body using the first additive manufacturing process to create at least a first portion of the third custom inlet end connection configuration based on the received third customer requirement, wherein the third custom inlet end connection configuration is different than the third initial inlet end connection configuration, the first custom inlet end connection configuration, and the second custom inlet end connection configuration.

2. A method of claim 1, wherein the first manufacturing position is the same as the second manufacturing position, and the third manufacturing position is not the same as the first manufacturing position.

3. A method of claim 1, wherein the first manufacturing position is same as the second manufacturing position, and the third manufacturing position is the same as the first manufacturing position.

4. A method of claim 1, further comprising:
removing material from the first inlet end connection of the first generic valve body in a first material removal process at the first manufacturing position to create at least a second portion of the first custom inlet end connection configuration;
removing material from the second inlet end connection of the second generic valve body in a second material removal process at the second manufacturing position to create at least a second portion of the second custom inlet end connection configuration; and
removing material from the third inlet end connection of the third generic valve body in a third material removal process at the third manufacturing position to create at least a second portion of the third custom inlet end connection configuration.

5. The method of claim 4, wherein each of the first, second, and third material removal processes is a cutting process using a lathe.

6. The method of claim 4, wherein each of the first, second, and third material removal processes and the first additive manufacturing process is performed by the same machining equipment.

7. The method of claim 6, wherein the machining equipment is a CNC lathe with directed energy laser deposition capabilities.

8. The method of claim 1, wherein the first additive manufacturing process is a directed energy laser deposition process.

9. The method of claim 1, wherein each of the first, second, and third inlet end connections is a butt weld end connection.

10. The method of claim 1, wherein each of the first, second, and third custom inlet end connection configurations is a flange configuration.

11. The method of claim 1, further comprising casting the first, second, and third generic valve bodies.

12. A method of custom manufacturing a plurality of different valve bodies for different customers, the method comprising:
storing a first generic valve body at a first storage location, the first generic valve body having a first inlet end connection and a first outlet end connection, wherein the first inlet end connection has a first initial inlet end connection configuration and the first outlet end connection has a first initial outlet end connection configuration,
storing a second generic valve body at a second storage location, the second generic valve body having a second inlet end connection and a second outlet end connection, wherein the second inlet end connection has a second initial inlet end connection configuration and the second outlet end connection has a second initial outlet end connection configuration, wherein the second initial inlet end connection configuration is identical to the first initial inlet end connection configuration and the second initial outlet end connection configuration is identical to the first initial outlet end connection configuration of the first valve body;
receiving a first customer requirement for a first custom inlet end connection configuration for the first generic valve body
transferring the first generic valve body from the first storage location to a first manufacturing position;
adding material to the first inlet end connection of the first generic valve body at the first manufacturing position, wherein adding material to the first inlet end connection of the first generic valve body at the first manufacturing position includes using a first additive manufacturing process to create at least a first portion of the first custom inlet end connection configuration based on the received first customer requirement, wherein the first custom inlet end connection configuration is different than the first initial inlet end connection configuration;
receiving a second customer requirement for a second custom inlet end connection configuration for the second generic valve body;
transferring the second generic valve body from the second storage location to a second manufacturing position; and
adding material to the second inlet end connection of the second generic valve body at the second manufacturing position, wherein adding material to the second inlet end connection of the second generic valve body at the second manufacturing position includes adding material to the second inlet end connection of the second generic valve body using the first additive manufacturing process to create at least a first portion of the second custom inlet end connection configuration, wherein the second custom inlet end connection configuration is different than the second initial inlet end connection configuration and the first custom inlet end connection configuration.

13. A method of claim 12, wherein the first manufacturing position is the same as the second manufacturing position.

14. A method of claim 12, wherein the first manufacturing position is not the same as the second manufacturing position.

15. A method of claim 12, further comprising:
removing material from the first inlet end connection of the first generic valve body in a first material removal process at the first manufacturing position to create at least a second portion of the first custom inlet end connection configuration; and
removing material from the second inlet end connection of the second generic valve body in a second material removal process at the second manufacturing position to create at least a second portion of the second custom inlet end connection configuration.

16. The method of claim 15, wherein each of the first and second material removal processes is a cutting process using a lathe.

17. The method of claim 15, wherein each of the first and second material removal processes and the first additive manufacturing process is performed by the same machining equipment.

18. The method of claim 12, wherein the first additive manufacturing process is a directed energy laser deposition process.

19. The method of claim 12, wherein each of the first and second inlet end connections is a butt weld end connection.

20. The method of claim 12, wherein each of the first and second custom inlet end connection configurations is a flange configuration.

* * * * *

UNITED STATES PATENT AND TRADEMARK OFFICE
CERTIFICATE OF CORRECTION

PATENT NO. : 11,192,212 B2
APPLICATION NO. : 16/443825
DATED : December 7, 2021
INVENTOR(S) : Tan K. Lai et al.

It is certified that error appears in the above-identified patent and that said Letters Patent is hereby corrected as shown below:

In the Specification

Column 1, Line 11, "2016," should be -- 2016, now Pat. No. 10,322,476, --.

Column 7, Line 13, "and or" should be -- and/or --.

In the Claims

Column 12, Lines 2-3, "configuration," should be -- configuration; --.

Column 12, Line 67, "position;" should be -- position; and --.

Column 13, Line 16, "A method" should be -- The method --.

Column 13, Line 20, "A method" should be -- The method --.

Column 13, Line 24, "A method" should be -- The method --.

Column 14, Lines 2-3, "configuration," should be -- configuration; --.

Column 14, Line 19, "body" should be -- body; --.

Column 14, Line 52, "A method" should be -- The method --.

Column 14, Line 54, "A method" should be -- The method --.

Column 14, Line 57, "A method" should be -- The method --.

Signed and Sealed this
Fifth Day of July, 2022

Katherine Kelly Vidal
*Director of the United States Patent and Trademark Office*